United States Patent [19]
Lischka

[11] Patent Number: 5,036,800
[45] Date of Patent: Aug. 6, 1991

[54] ANIMAL WATERING DEVICE

[76] Inventor: Kenneth A. Lischka, Box 51, Steelman, Saskatchewan, Canada, S0C 2J0

[21] Appl. No.: 592,331

[22] Filed: Oct. 3, 1990

[51] Int. Cl.$^5$ .............................................. A01K 7/00
[52] U.S. Cl. ................................................... 119/75
[58] Field of Search .............................. 119/73, 75, 78

[56] References Cited

U.S. PATENT DOCUMENTS

| | | | |
|---|---|---|---|
| 3,306,263 | 2/1967 | Johnson | 119/73 |
| 3,745,977 | 7/1973 | Martin | 119/75 X |
| 3,943,889 | 3/1976 | Sparber | 119/73 |
| 4,708,091 | 11/1987 | Schafer | 119/73 |
| 4,739,727 | 4/1988 | Boyer | 119/73 |
| 4,883,022 | 11/1989 | Barker | 119/73 |
| 4,922,858 | 5/1990 | Ahrens | 119/73 |

*Primary Examiner*—Gene Mancene
*Assistant Examiner*—R. Thomas Price
*Attorney, Agent, or Firm*—Adrian D. Battison; Stanley G. Ade; Murray E. Thrift

[57] ABSTRACT

A watering device for animals includes a cylindrical container with an open top and surrounding lip around the open top. A closure member for the open top includes a disc which is flat with a surrounding skirt extending along the sides of the container. The skirt has holes to allow the escape of air trapped under the closure member. The closure member carries a downwardly extending guide member on the under surface which carries a float and which is guided for movement in a vertical direction. The float is located under the water surface so that depression of the closure member and the float do not significantly alter the water depth. The float keeps the closure member up against the lip thus fully closing the container. The animal depresses the closure to a level under the water surface to access the water for drinking. If the water level falls, the downward pressure for the animal to access the water engages a valve to refill the container. The natural tendency of the animal is to maintain the water level at a required level below the top. This arrangement reduces the tendency of the animal to spoil or spill the water.

10 Claims, 2 Drawing Sheets

ANIMAL WATERING DEVICE

BACKGROUND OF THE INVENTION

This invention relates to an animal watering device for supplying drinking water to an animal.

Animals such as beef and dairy cattle of course require to receive drinking water while they are generally confined to a pen or other location where they cannot access water at will.

Various designs of water dispensing device have been provided from the very simple open trough to various forms of drinking cups. Most animals of this type are sufficiently intelligent to actuate various forms of valve to dispense water into a trough or cup from which the water can be drunk.

In many cases animals confined to a pen tend to alleviate boredom by licking at a water dispenser or generally playing with the water dispenser leading to dispensing of excess amounts of water and spillage. Such excess water is of course disadvantageous in that it increases the amount of water required, and since the excess water falls to the floor in spillage or passes through the animal and requires an increased amount of clean up.

Particularly cattle who are often supplied with drinking water in a drinking cup or fountain with a flap valve or nose button, the open accessibility of the water encourages the animal to lick at the device tending to spill or spread water around the device. This excess water constantly dripping around the area of the drinking fountain can lead to corrosion of metal and concrete parts and can spoil bedding and feed.

SUMMARY OF THE INVENTION

It is one object of the present invention, therefore, to provide an animal watering device which provides ready access to the animal to drinking water but which reduces the tendency of the animal to dispense excess water or to play with the water.

According to a first aspect of the invention, therefore, there is provided a watering device for animals comprising a container for receiving water for dispensing to the animal, the container having a closed base and closed sides and defining a top surface having an opening therein, means for connection to a water supply for discharge of water into the container, valve means for controlling the discharge, control means responsive to demand for water to the container to actuate the valve means, a closure member for the opening mounted within the container and movable upwardly and downwardly in the container from an uppermost position closing the opening to a lower position in which the closure member is depressed under the water surface to allow access by the animal to the water surface for drinking, and means biasing the closure member upwardly toward the uppermost closed position.

According to the second aspect of the invention, therefore, there is provided a watering device for animals comprising a container for receiving water for dispensing to the animal, the container having a closed base and closed sides and defining a top surface having an opening therein, means for connection to a water supply for discharge of water into the container, valve means for controlling the discharge, control means responsive to demand for water from the container to actuate the valve means, a closure member comprising a substantially flat plate member for the opening mounted within the container and movable upwardly and downwardly in the container from an uppermost position closing the opening to a lower position in which the closure member is depressed under the water surface to allow access by the animal to the water surface for drinking, means biasing the closure member upwardly toward the uppermost closed position, means for guiding movement of the closure member in a substantially vertical direction, means for maintaining the plate member substantially horizontal during said movement thereof, the control means being actuated by depression of the closure member below a predetermined lower position, the biasing means comprising a float member mounted on the closure member and positioned within the water so as to provide buoyancy tending to lift the closure member, the float member being mounted upon the closure member at a position such that it is maintained below the surface of the water both in the uppermost position and the lower positions such that the surface level of the water remains substantially unaltered as the closure member is depressed from the upper most position to the lower position.

The container according to the invention therefore except when the animal wishes to access the water for drinking provides a substantially closed container with the closure member preventing any access to the water. The animal must therefore have sufficient incentive or desire to depress the closure member to a level to reach the surface of the water before the animal can access drinking water. It has been found that this significantly reduces the tendency of the animals to play with the water or to lick the water and spread it around the area of the drinking container. In addition the container is substantially closed and hence there is less tendancy for materials to fall into the container and to ferment in the moisture leading to contamination and possible disease.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
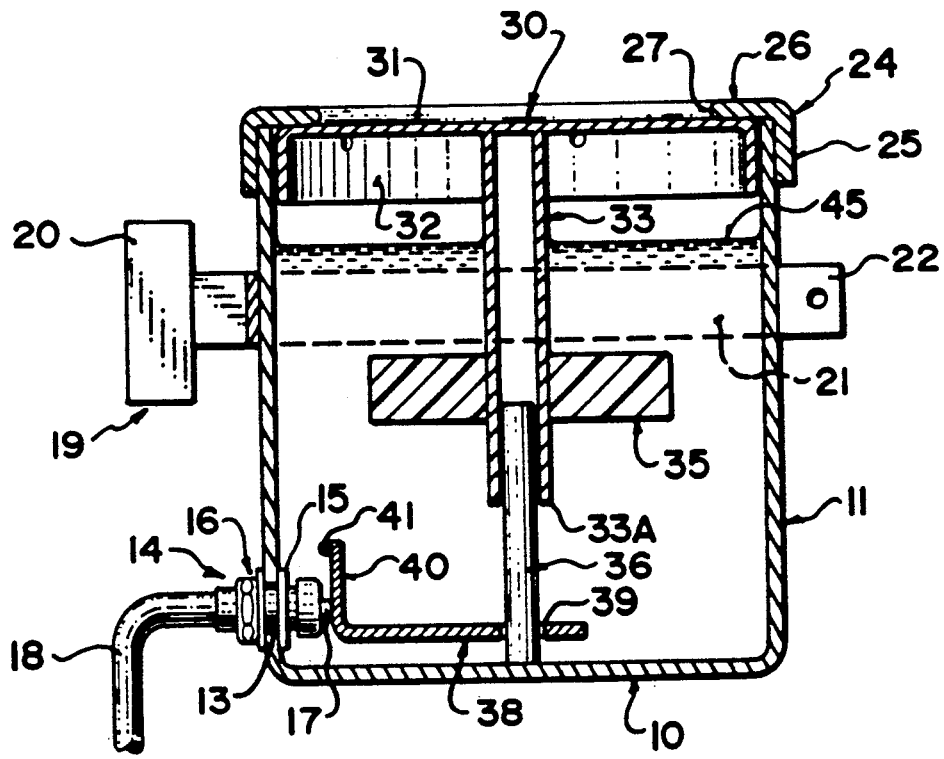
FIG. 1 is a vertical cross sectional view through a watering device according to the present invention.
Figure 2:
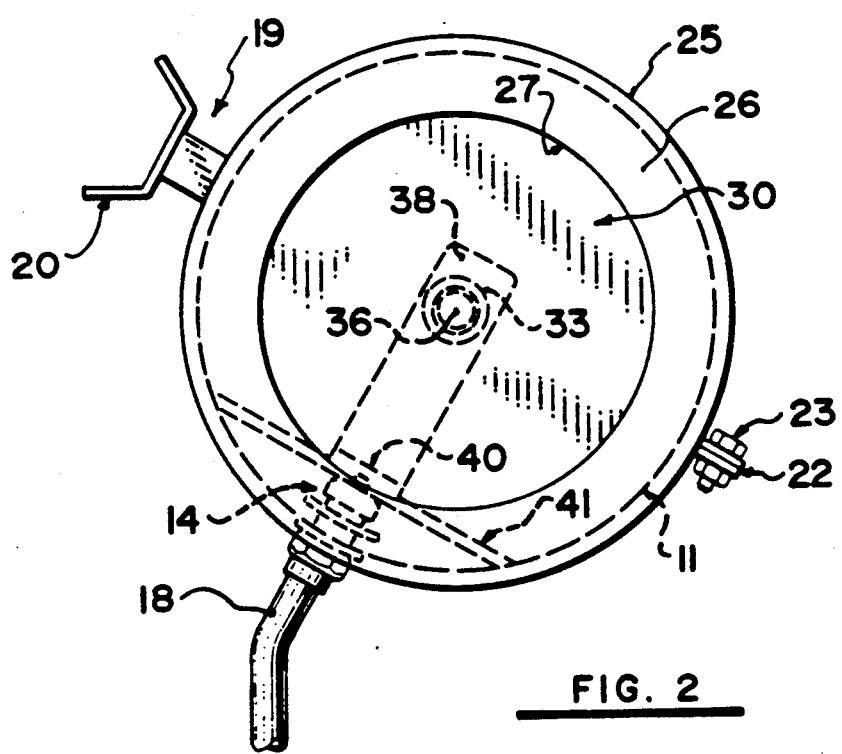
FIG. 2 is a top plan view of the device of FIG. 1.

The watering device comprises a container having a base 10 and upstanding side walls. In this case the container is of circular horizontal cross section thus defining a cylindrical side wall 11 surrounding the whole device but other shapes of course are possible. The container thus formed is closed apart from a small opening 13 through which a valve 14 projects for dispensing water into the container. The valve includes a flange 15 and a nut and washer arrangement 16 by which it is clamped to the wall of the container around the opening. The valve is of the type including a press button 17 which when pressed allows the valve to discharge water into the container from a supply pipe 18 suitably provided.

A bracket for attachment of the container to a suitable support is generally indicated at 19 and includes a channel member 20 for attachment to a post, and a pair of half cylindrical bands 21 which extend around the cylindrical wall 11 and clamp together at a pair of flanges 22 connected by a bolt arrangement 23.

At the top of the cylindrical is provided an end cap 24 having a sleeve portion 25 surrounding the upper end of the cylindrical wall 11 and an inturned lip portion 26 which extends partly across the upper surface leaving a circular opening 27 constituting almost the whole of the upper surface of the container.

Across the top of the container is provided a closure member generally indicated at 30 defined by a flat horizontal plate 31 with a downturned peripheral wall 32 surrounding the periphery of the circular plate 31. The peripheral wall 32 lies just inside the inside surface of the wall 11 of the container so as to act as a sliding fit along the inside wall of the container which acts to guide vertical movement of the closure member 30 and to prevent access underneath the lip or outside edge of the plate member 31.

On the underside of the plate member 31 is defined a sleeve 33 extending downwardly therefrom along a central axis thereof. The sleeve extends from the underside of the plate member to a position adjacent to but spaced from the bottom of the container and carries at a lower end thereof a float member 35 formed of a suitable buoyant foam material which is fixed to the sleeve 33 and thus acts to provide an upward force on the sleeve 33 due to the buoyancy of the foam float member 35 within the water.

A vertical pin 36 extends from a position connected to the inside surface of the base 10 vertically upwardly along the axis of the container. The pin 36 projects into the interior of the sleeve 33 and thus acts as a guide for the sleeve 33 in its vertical movement with the closure member 30. The pin 36 on the inside surface of the wall 11 thus acts to guide the closure member in vertical movement. The closure member is however biased vertically upwardly by the float member 35 to a position in which the upper surface of the closure member engages the underside of the lip 26 thus holding the closure member in an upper most closed position in which the animal cannot directly access the water and in which no contaminating material can fall into the water past the closure member.

The closure member can however be pushed downwardly by the animal against the force provided by the float 35. When pushed sufficiently downwardly, a lower edge 33A of the sleeve 33 engages a lever 38 in the form of a flat plate member with a hole in the plate indicated at 39 and surrounding the pin 36. An end of the plate opposite to the hole 39 includes a vertical leg 40 mounted upon a cross pin 41 about which the lever can pivot. The cross pin is positioned above the valve 14 and a lower part of the leg 40 is arranged to engage the button 17 of the valve so that downward pressure on the plate 38 causes the valve button 17 to be pressed so as to dispense water into the container.

Figure 3:
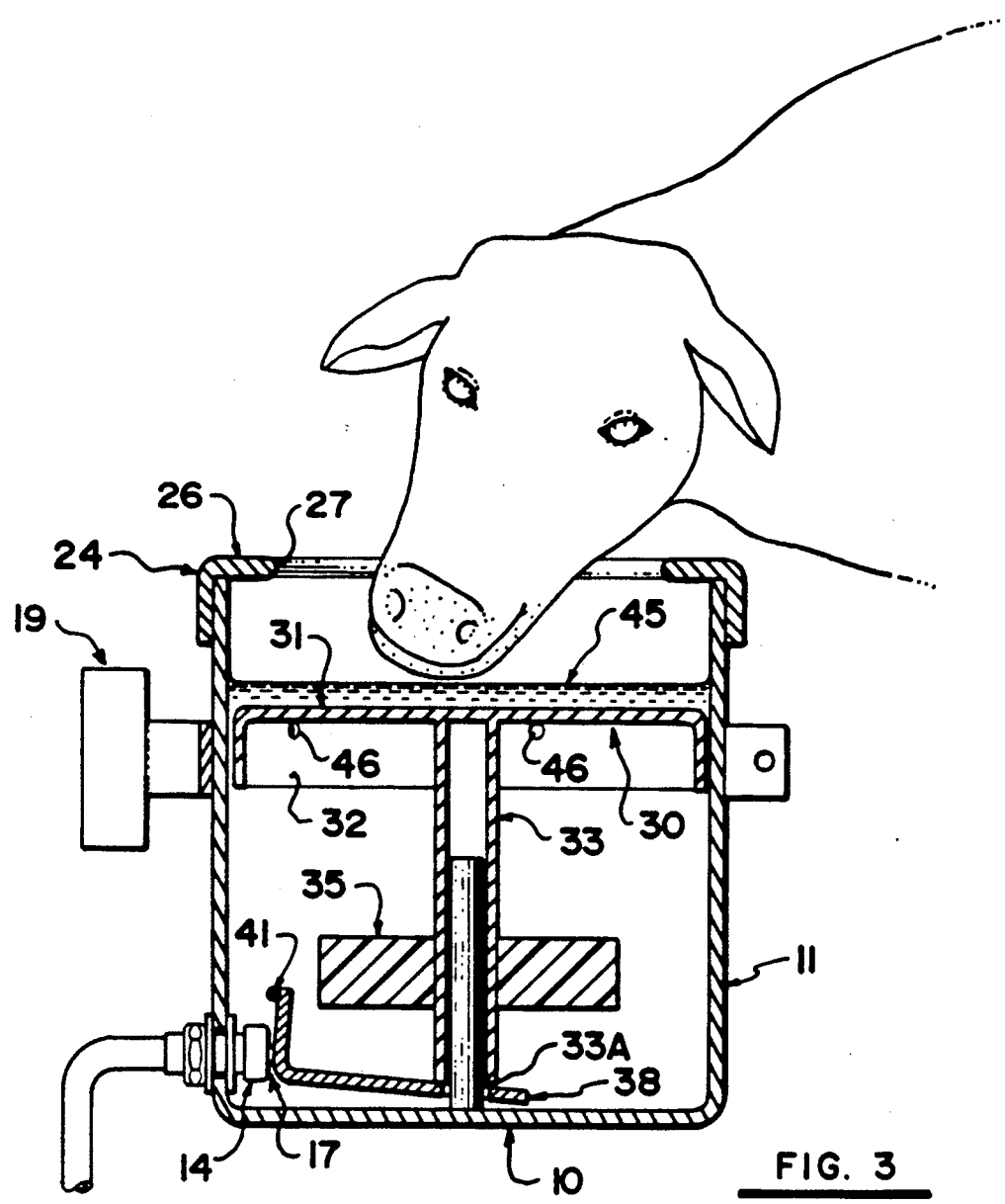
FIG. 3 is cross sectional view similar to FIG. 1 showing the device in an operating position with an animal accessing the drinking water.

In operation, the substantially closed nature of the container in the normal upper position of the closure member discourages the animal from playing with the device or from attempting to splash water into the area around the device. However when the animal is sufficiently thirsty, the animal ca depress the closure member as shown in FIG. 3. In a normal operating condition of the device, the container is substantially filled with water to a position below the top edge with a surface of the water being indicated at 45 in FIGS. 1 and 3. As the closure member is depressed, any air contained within the area under the closure member defined by the peripheral wall 32 is caused to escape from that area by passage through openings 46 provided in the peripheral 32 adjacent the underside of the plate 31. Thus the water level of the surface 45 does not vary significantly since the float 35 remains at all time under the water level and therefore the only additional material pressed under the water is the thin sheet material defined in the plate 31, the peripheral wall 32 and the small portion of the sleeve 33. There is therefore no tendency of the water to rise vigorously and to spill over from the upper opening of the container. Once the animal has depressed the closure member to a sufficiently low position so that the water surface is above the closure member, the animal can access the water and drink readily from the upper surface of the water. If the level of the water falls below a predetermined level, the amount of water above the upper surface of the plate 31 will be insufficient for the animal to drink and hence the animal will press the plate further downwardly until the bottom edge 33A of the sleeve 33 actuates the push button 17 of the valve to introduce more water. While depressing the plate the animal will not in practice inject too much water to a position escaping over the top opening in the container since this will cause the animals nose to be deeper in the water than the animal prefers so the animal tends to lift its nose and mouth away from the upper surface of the plate causing the plate to rise as the water becomes deeper. The device therefore provides a system in which the level of the water is controlled by the animal but within limits determined by the natural tendencies of the animal. The animal thus will keep the water at a lower most level sufficient to cover the plate member when it is depressed. The animal also is discouraged from overfilling the device by its tendency to pull away from the device when the water becomes too deep. With the level of the water in this range, therefore, the surface is kept below the opening in the top by sufficient distance to prevent splashing and by a sufficient distance to prevent the small amount of rise in the surface level caused by the emersion of the plate member to cause the water to approach or overflow the opening.

In an alternative arrangement (not shown) the lever 38 can be replaced by a valve arrangement which directly contacts the underside of the plate 31 in its position of lowermost depression where further water is required.

The device can simply be cleaned by removal of the end cap 24, removal of the closure member by lifting it off the pin 36 and by sucking out all remaining water and contaminating materials from the container by for example a vacuum.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A watering device for animals comprising a container for receiving water and for dispensing water to the animal, the container having a closed base and closed sides and defining a top surface having an opening therein, means for connection to a water supply for discharge of water into the container, valve means for controlling the discharge of water, control means for actuating the valve means to maintain a top surface of the water below the opening and above a predetermined lower level, a closure member for the opening mounted within the container and movable upwardly and downwardly in the container from an uppermost position in which the opening is fully closed to prevent exposure of the water surface to a lower position in which the closure member is depressed under the water surface to allow access by the animal to the water surface for drinking, means biasing the closure member upwardly toward the uppermost closed position, said closure member comprising a substantially flat plate member formed of a thin sheet material and shaped such that, when depressed to the lower position, the whole of the closure member is immersed under the water surface and including means for releasing any and all air trapped under said plate member when immersed, means for guiding movement of the closure member in a substantially vertical direction and for maintaining the plate member substantially horizontal during said movement thereof, said biasing means comprising a float member mounted on the closure member and positioned within the water so as to provide buoyancy tending to lift the closure member, said float member being mounted upon the closure member at a position such that it is maintained below the surface of the water both in the uppermost position and at lower positions such that the surface level of the water remains substantially unaltered as the closure member is depressed from the uppermost position to the lower position.

2. A watering device according to claim 1 including a lip at the top surface surrounding the opening arranged to engage and confine the closure member at the uppermost position thereof.

3. A watering device according to claim 1 wherein the control means is arranged such that the control means is actuated by depression of the closure member to a predetermined lower position in which the closure member is fully immersed in the water thus automatically detering the animal from discharging an excess amount of water.

4. A watering device according to claim 1 wherein the closure member comprises said substantially flat plate member having a depending rim around the periphery thereof, a support member extending downwardly from the underside of the plate member, the float member being mounted on the support member at a position spaced downwardly from the underside of the plate member such that the float member is maintained beneath the surface of the water.

5. A watering device according to claim 4 wherein the support member comprises a sleeve extending vertically downwardly from the underside of the plate member and wherein there is provided a guide pin extending vertically upwardly from the base of the container along which the sleeve slides to control movement of the plate member in a substantially vertical direction and to maintain the plate member substantially horizontal.

6. A watering device according to claim 5 wherein the control means comprises a lever member positioned within the container for engagement thereof by the support member at a predetermined depressed position thereof.

7. A watering device according to claim 1 wherein the opening constitutes substantially the whole of the top surface of the container.

8. A watering device according to claim 1 wherein the container includes a removable top cap shaped to define said opening and to confine the closure member such that removal of the top cap enables removal of the closure member for access to the interior of the container.

9. A watering device for animals comprising a container for receiving water for dispensing to the animal, the container having a closed base and closed sides and defining a top surface having an opening therein constituting substantially the whole of the top surface, means on the container for connection to a water supply for discharge of water into the container, valve means mounted within the container for controlling the discharge of water, a closure member comprising a substantially flat plate member for the opening mounted within the container and movable upwardly and downwardly in the container from an uppermost position in which the opening is fully closed to prevent exposure of the water surface to a lower position in which the whole of the closure member is depressed under the water surface to allow access by the animal to the water surface for drinking, the flat plate member being formed of a thin sheet material and including means releasing any and all air trapped under the plate member when immersed, means biasing the closure member upwardly toward the uppermost closed position, guiding means for guiding movement of the plate member in a substantially vertical direction, and for maintaining the plate member substantially horizontal during said movement thereof, and control means mounted within said container for actuating said valve, said control means being actuated in response to depression of the closure member below a predetermined lower position by engagement with said closure member, the biasing means comprising a float member mounted on the closure member and positioned within the water so as to provide buoyancy tending to lift the closure member, the position of the float member upon the closure member and the position of the control means relative to the closure member being arranged such that the float member is maintained below the surface of the water both in the uppermost position and the lower positions and the surface level of the water remains substantially unaltered as the closure member is depressed from the uppermost position to the lower position.

10. A watering device according to claim 9 including a lip at the top surface surrounding the opening arranged to engage and confine the closure member at the upper most position thereof.

* * * * *